(12) United States Patent
Shingyoji (10) Patent No.: US 8,188,916 B2
(45) Date of Patent: May 29, 2012

(54) POSITION/TIME DETECTING APPARATUS AND TIMEPIECE INCLUDING THE APPARATUS

(75) Inventor: Ryuji Shingyoji, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 263 days.

(21) Appl. No.: 12/275,479

(22) Filed: Nov. 21, 2008

(65) Prior Publication Data

US 2009/0140919 A1    Jun. 4, 2009

(30) Foreign Application Priority Data

Dec. 4, 2007    (JP) ................................. 2007-313333

(51) Int. Cl.
*G01S 19/34* (2010.01)
*G01S 19/24* (2010.01)
*G01S 19/27* (2010.01)

(52) U.S. Cl. .......... 342/357.74; 342/357.63; 342/357.66

(58) Field of Classification Search ............. 342/357.06, 342/357.63, 357.66, 357.74
See application file for complete search history.

(56) References Cited

U.S. PATENT DOCUMENTS

| | | | | |
|---|---|---|---|---|
| 5,627,548 A | * | 5/1997 | Woo et al. ................. | 342/357.57 |
| 6,112,054 A | * | 8/2000 | Kita .............................. | 455/12.1 |
| 6,240,366 B1 | * | 5/2001 | Nagatsuma et al. .......... | 701/213 |
| 6,559,794 B1 | * | 5/2003 | Nakajima et al. ........ | 342/357.31 |
| 6,675,011 B1 | * | 1/2004 | Kita ............................. | 455/422.1 |
| 6,912,242 B2 | * | 6/2005 | Farine et al. ................... | 375/147 |
| 7,812,763 B2 | * | 10/2010 | Baba et al. ............... | 342/357.67 |
| 2005/0157592 A1 | * | 7/2005 | Nakamura ...................... | 368/47 |
| 2006/0167647 A1 | * | 7/2006 | Krumm et al. ................ | 702/130 |
| 2007/0210957 A1 | * | 9/2007 | Brodie et al. ............ | 342/357.06 |
| 2011/0012785 A1 | * | 1/2011 | Mattos ..................... | 342/357.66 |
| 2011/0037649 A1 | * | 2/2011 | Rao ........................... | 342/357.59 |

FOREIGN PATENT DOCUMENTS

JP    2007-256041 A    10/2007

\* cited by examiner

*Primary Examiner* — Thomas Tarcza
*Assistant Examiner* — Frank McGue
(74) *Attorney, Agent, or Firm* — Holtz, Holtz, Goodman & Chick, PC (57) ABSTRACT

The number of GPS satellites from which radio waves are received and the intensities of radio waves received from the GPS satellites are acquired. In a first state in which radio waves of a first signal intensity are received from four GPS satellites in a first predetermined time, orbit/time information are acquired from the respective GPS satellites. The time information indicates a radio-wave emission GMT clock time at the satellite when the radio waves were emitted from the satellite. In a second state in which radio waves of a second signal intensity lower than the first intensity are received from one or more GPS satellites within a second time longer than the first predetermined time, the time information is acquired from the respective GPS satellites. In the first state, a current time and a current position of the GPS timepiece is calculated based on the time/orbit information. In the second state, a current time is calculated based on the time information.

21 Claims, 12 Drawing Sheets

POSITION/TIME DETECTING APPARATUS AND TIMEPIECE INCLUDING THE APPARATUS

CROSS-REFERENCE TO RELATED APPLICATION

This application is based upon and claims the benefit of priority from the prior Japanese Patent Application No. 2007-313333, filed Dec. 4, 2007, the entire contents of which are incorporated herein by reference.

BACKGROUND OF THE INVENTION

1. Field of the Invention

The present invention relates to position/ime detection apparatus using a GPS (Global Positioning System) and timepieces using the detecting apparatus.

2. Descriptions of the Related Art

Measurement of a current position a correct time of a device using a GPS is performed in many fields for example, of car navigation.

Figure 12:
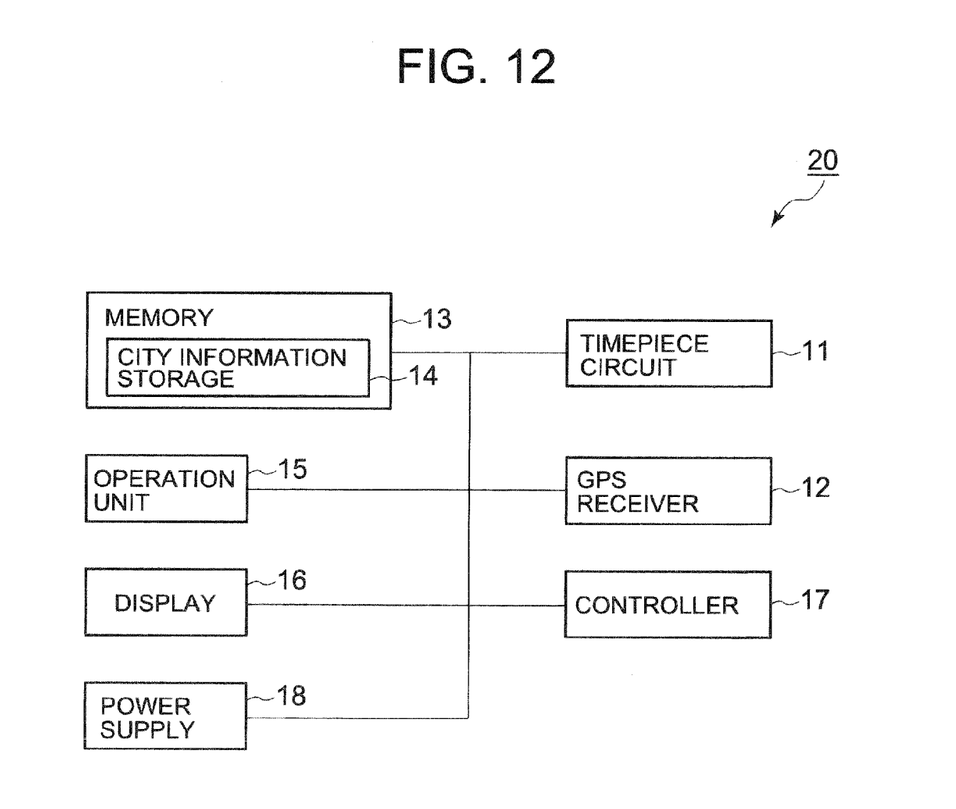
FIG. 12 is a block diagram of a prior art GPS timepiece.

GPS wristwatches have been proposed which each receive radio waves from GPS satellites to detect its position. As shown in FIG. 12, this wristwatch 20 comprises a timepiece circuit 11, a GPS receiver 12 which receives the GPS radio waves, a memory 13 which has a city information storage area 14, an operation unit 15 including various input keys, a display 16 which includes a liquid crystal display, a controller 17 and a power supply 18.

The city information storage area 14 of the memory 13 has stored data on the latitudes and longitudes of main cities in the world and on time differences of those cities from their associated standard times. The memory 13 further has another area which has stored programs to realize various functions of the GPS timepiece 20, and data produced as results of various processing operations performed by the controller 17.

The controller 17 displays on the display 16 time counted by the timepiece circuit 11. In response to an input from the operation unit 15 or at predetermined intervals of time, the controller 17 causes the GPS receiver 12 to receive the GPS radio waves and acquires information included in the GPS radio waves. The controller 17 calculates a current time and a current position of the GPS timepiece 20 based on the information acquired from the GPS receiver 17. In addition, the controller 17 compares the latitude and longitude of the calculated current position of the timepiece 20 with the latitudes and longitudes of the respective cities stored in the city information storage area 14 to locate a city where the GPS timepiece 20 is positioned at present and calculates a current time of the city, additionally using a time difference of the located city. The controller 17 then adjusts the time of the timepiece circuit 11 based on the calculated current time and then displays the corrected current time on the display 16.

The GPS receiver 12 operates in response to the operation unit 15 or at predetermined intervals of time. The position measurement of the GPS timepiece 20 is usually performed by receiving radio waves from four GPS satellites. The GPS radio waves include information on the orbits of these GPS satellites and information on GMT (Greenwich Mean Time) clock times at these GPS satellites when these respective satellites emitted the radio waves. This GMT clock time can be hereinafter referred to as a radio-wave emission GMT clock time. The GPS timepiece 20 calculates three dimensional coordinates (x, y, z) of the current position thereof and a time error $\delta$ involved in the current time of the GPS timepiece based on these information.

Situations occur often where it is difficult to acquire the orbit information and the radio-wave emission GMT clock time information on the four respective GPS satellites. Published Unexamined Japanese Patent Application No. 2007-256041 discloses a navigation device which includes a GPS receiver which detects changes in the environment where the GPS measurement is performed and in the altitude of the navigation device above sea level, thereby switching between 2- and 3-dimensional position measurements. When the 2-dimensional measurement is employed as the environment where the GPS measurement is performed deteriorates, the number of GPS satellites from which the GPS radio waves should be acquired is reduced to 3.

Especially, with a small GPS timepiece, for example, of a wristwatch type which employs a battery as a power supply, reduction in the power consumption is required. In order to obtain a correct current time and a correct current position of the timepiece periodically, the GPS receiver is required to be operated periodically. The current power consumption of the GPS receiver is high, or tens of milliwatt. Thus, when the GPS receiver is operated in the environment where the intensity of the received GPS radio waves is low, a long time is required to acquire information on the orbits and the radio wave-emission GMT clock times of the GPS satellites and as the case may be, the reception can fail. That is, with a small device such as uses a battery as its power supply, it is very important to avoid an undesirable situation in which satisfactory measurement of the position of the GPS timepiece cannot be obtained in spite of consumption of much power from the battery.

It is therefore an object of the present invention to provide a position/ime detecting apparatus capable of measuring its current position and current time in an appropriate manner by suppressing useless consumption of power and a timepiece including the position/time detecting apparatus.

SUMMARY OF THE INVENTION

In one aspect, the present invention provides a position/time detecting apparatus comprising: GPS reception means for receiving radio waves from GPS satellites and for acquiring information included in the radio waves; reception state detection means for acquiring from the received radio waves the number of GPS satellites from which the radio waves were received, and the respective intensities of the radio waves received from the GPS satellites; time measuring means for measuring time; position/time calculating means for calculating a current position and a current time of the position/time detecting apparatus based on the information acquired by the GPS reception means; and wherein: in a first state in which the GPS reception means has received radio waves of a first quality value from a first predetermined number of GPS satellites within a first predetermined time measured by the time measuring means, the GPS reception means acquires orbit information and time information from radio waves emitted by the respective GPS satellites, the time information indicating the GMT at the respective GPS satellite when the satellite emitted the radio waves; in a second state in which the GPS reception means has received radio waves of a second quality value smaller than the first quality value from a second predetermined number of GPS satellites smaller than the first predetermined number of GPS satellites within a second predetermined time longer than the first predetermined time measured by the time measuring means, the GPS reception means acquires time information from radio waves emitted by the respective GPS satellites, the time information indicating a GMT at the respective GPS satellite when the satellite emitted the radio waves; the position/time calculating means calculates in the first state the current position and current time of the position/time detecting apparatus based on the orbit information and the time information; and the position/time calculating means calculates in the second state the current time based on the time information.

In another aspect, the present invention provides a timepiece comprising: the position/time detecting apparatus as described above; an internal clock; a timepiece circuit which counts a current time in accordance with the internal clock provided therein; and adjusting means for adjusting a current time of the timepiece circuit in accordance with the current time acquired by the position/time detecting apparatus.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
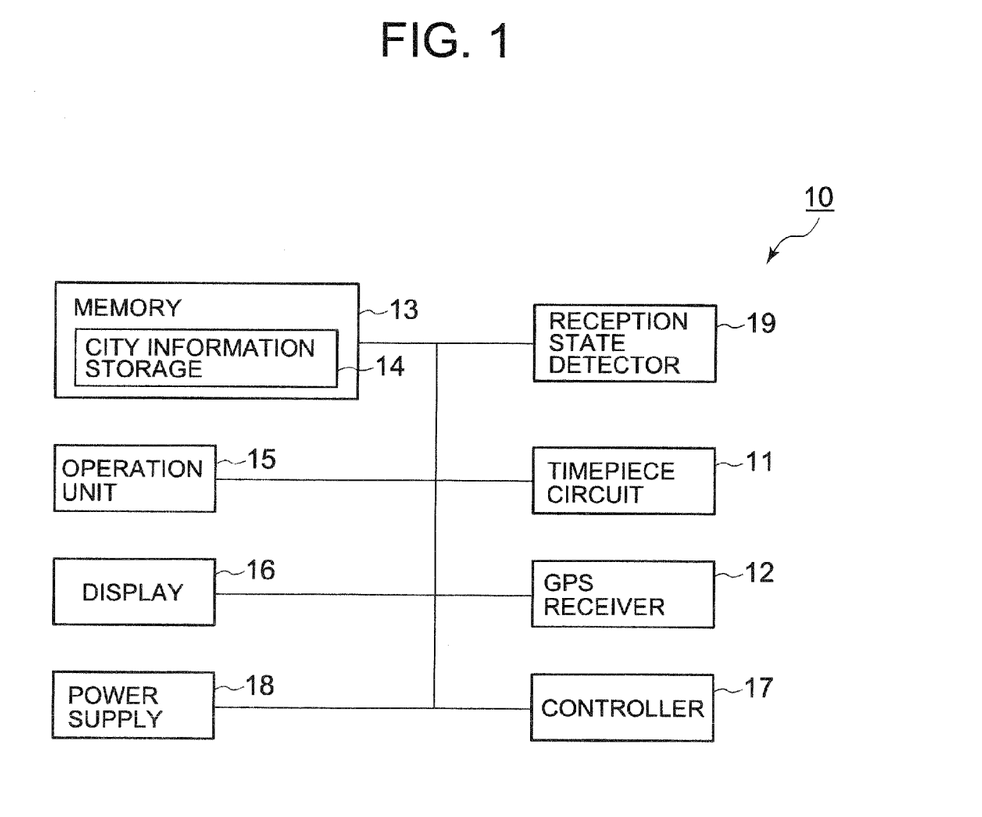
FIG. 1 is a block diagram of a GPS timepiece according to one embodiment of the present invention.

Referring to the accompanying drawings, the first embodiment of the present invention will be described. FIG. 1 is a block diagram of the GPS timepiece according to the first embodiment. As shown in FIG. 1, the GPS timepiece 10 comprises a timepiece circuit 11, a GPS receiver 12 which receives radio waves from GPS satellites, a memory 13 which has a city information storage area 14 and an area which stores various information, an operation unit 15 which includes various input keys, a display including a liquid crystal display 16, a controller 17, a power supply 18 and a reception state detector 19.

The timepiece circuit 11 counts time in accordance with an internal clock signal generated from a crystal resonator(not shown), acquires an accurate current time based on radio-wave emission GMT clock time information acquired by the GPS receiver 12 and corrects the counted time. The GPS receiver 12 demodulates the radio waves received from the GPS satellites and then acquires various information such as the radio-wave emission GMT clock time information and the orbit information on the GPS satellites.

The city information storage area 14 included in the memory 13 has stored information on the latitudes and longitudes of various main cities in the world and time differences each from a standard time at a respective city. The memory 13 also has stored programs which perform various functions of the timepiece and data produced in processing performed by the controller 17.

The controller 17 displays on the display 16 the time counted by the timepiece circuit 11 in accordance with an associated one of the programs stored in the memory 13. In response to an input from the operation unit 15 or at predetermined intervals of time, the controller 17 causes the GPS receiver 12 to receive the GPS radio waves and hence acquire information included in the GPS radio waves. The controller 17 then calculates the current position of the GPS timepiece 10 and a standard current time at the GPS timepiece based on the information acquired by the GPS receiver 17. In addition, the controller 17 compares the latitude and longitude of the calculated current position of the GPS timepiece 10 with the latitudes and longitudes stored in the city information storage area 14 to specify a city where the GPS timepiece 10 is present and calculates the current time of that city, using its time difference. Further, the controller 17 adjusts a time indicated the timepiece circuit 11 based on the calculated current time and displays a resulting current time on the display 16.

The reception state detector 19 cooperates with the controller 17 to detect the GPS radio waves received by the GPS receiver 12 and the number of GPS satellites which emitted the GPS radio waves.

In the GPS timepiece 10 of this embodiment, basically, the GPS receiver 12 receives radio waves from four GPS satellites, calculates a current three-dimensional position of the GPS timepiece 10 based on the information included in the GPS radio waves, and obtains a correct current time in accordance with the standard time information and the radio-wave emission GMT clock time information included in the GPS radio waves.

Especially in this embodiment, the reception state detector 19 acquires information on the number of GPS satellites from which the GPS receiver 17 has received the radio waves and on their intensities, and optimally controls one reception time and a process to be performed depending on the number of GPS satellites from which the radio waves have been received and on the intensities of the radio waves received. Thus, in each of two cases when the GPS radio waves are received satisfactorily and unsatisfactorily, respectively, from the GPS satellites, the controller 17 determines what optimal information to be acquired is, and then calculates a current time and a current position of the GPS timepiece 20. The reception state detector 19 also prevents continuation of useless reception of the GPS radio waves for a long time, and hence useless consumption of the battery.

Figure 2:
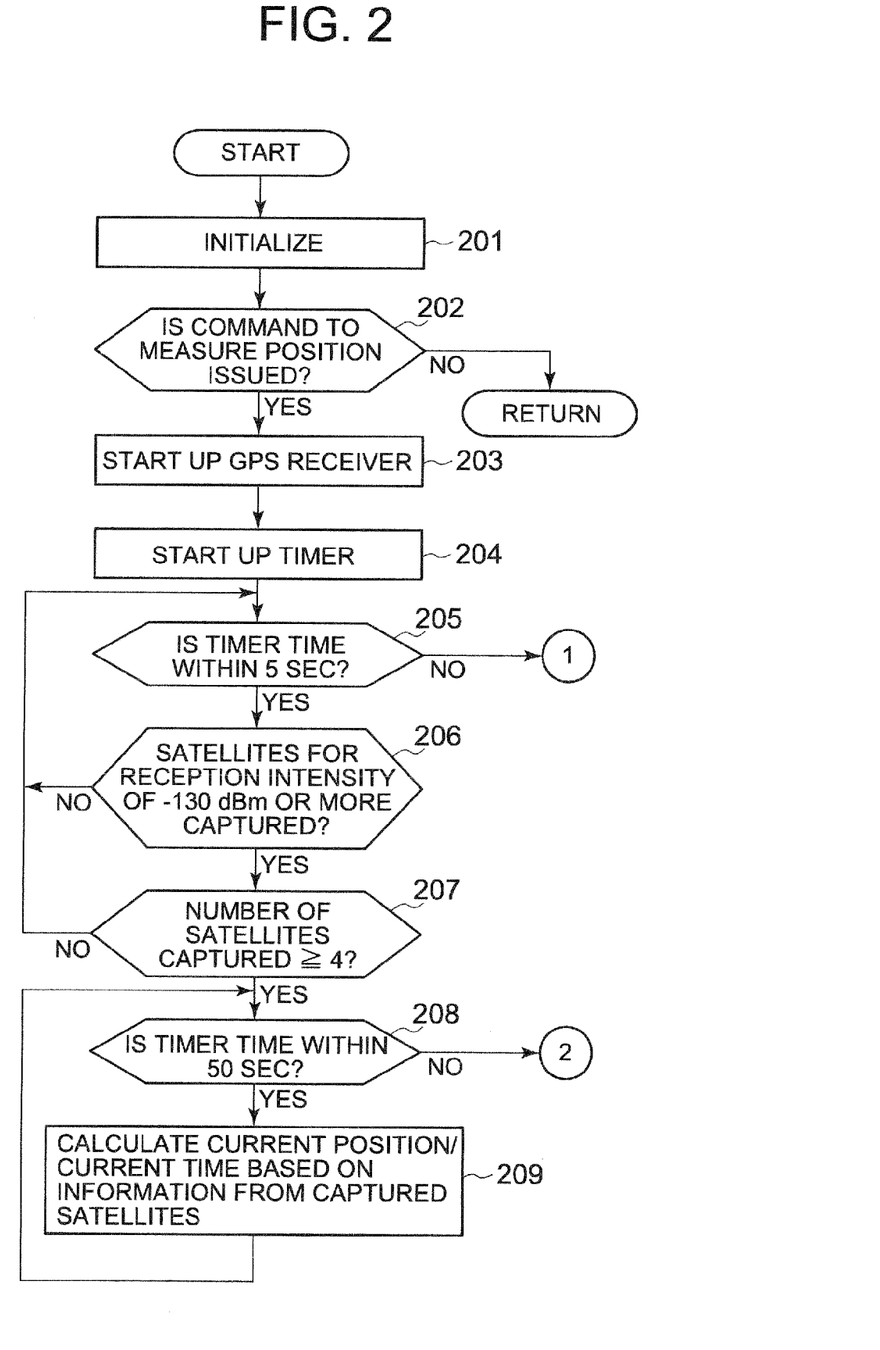
FIG. 2 is a flowchart of a position/time calculation process to be performed in the GPS timepiece in the first embodiment.
Figure 3:
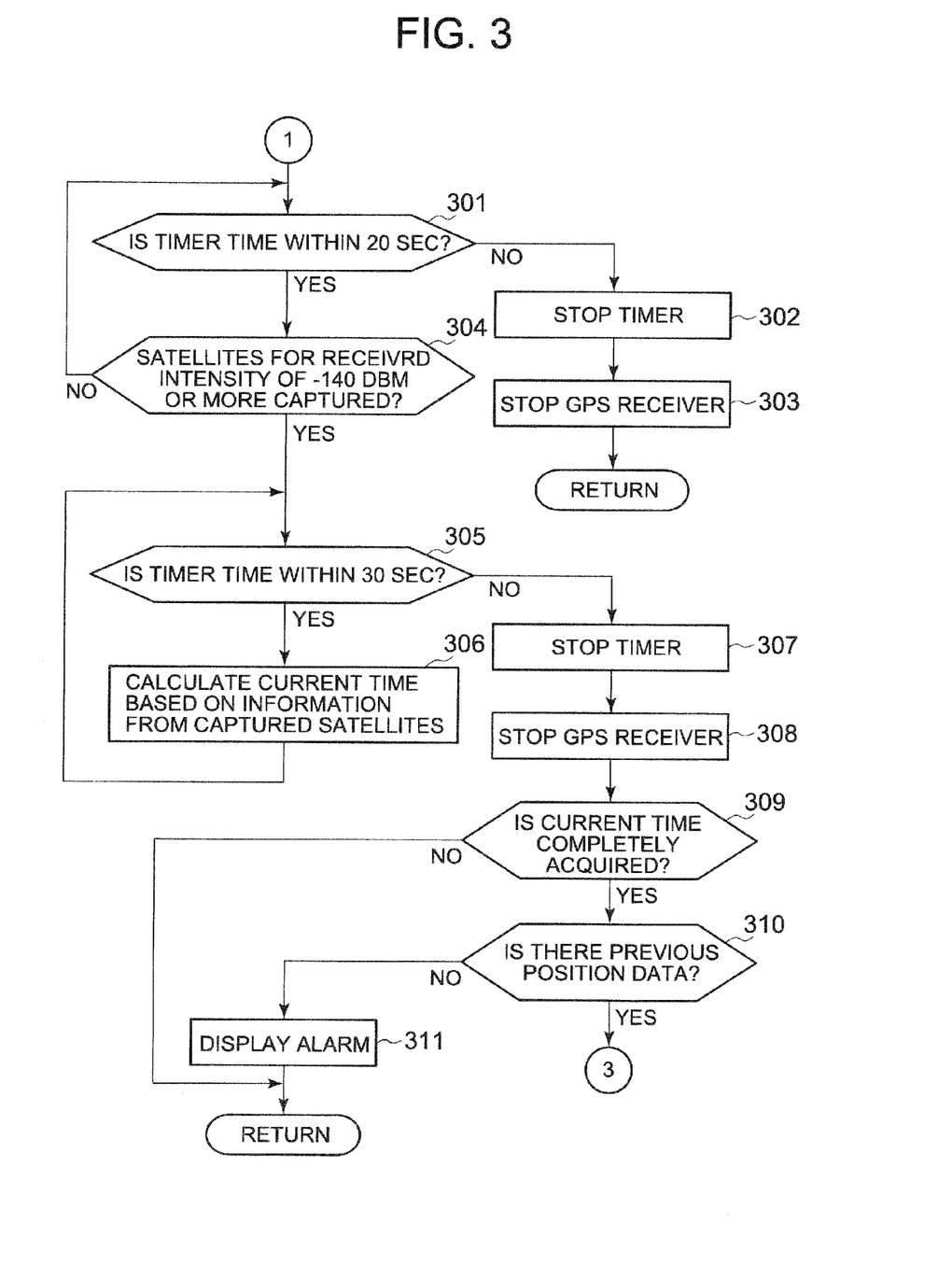
FIG. 3 is a flowchart continued to the FIG. 2.
Figure 4:
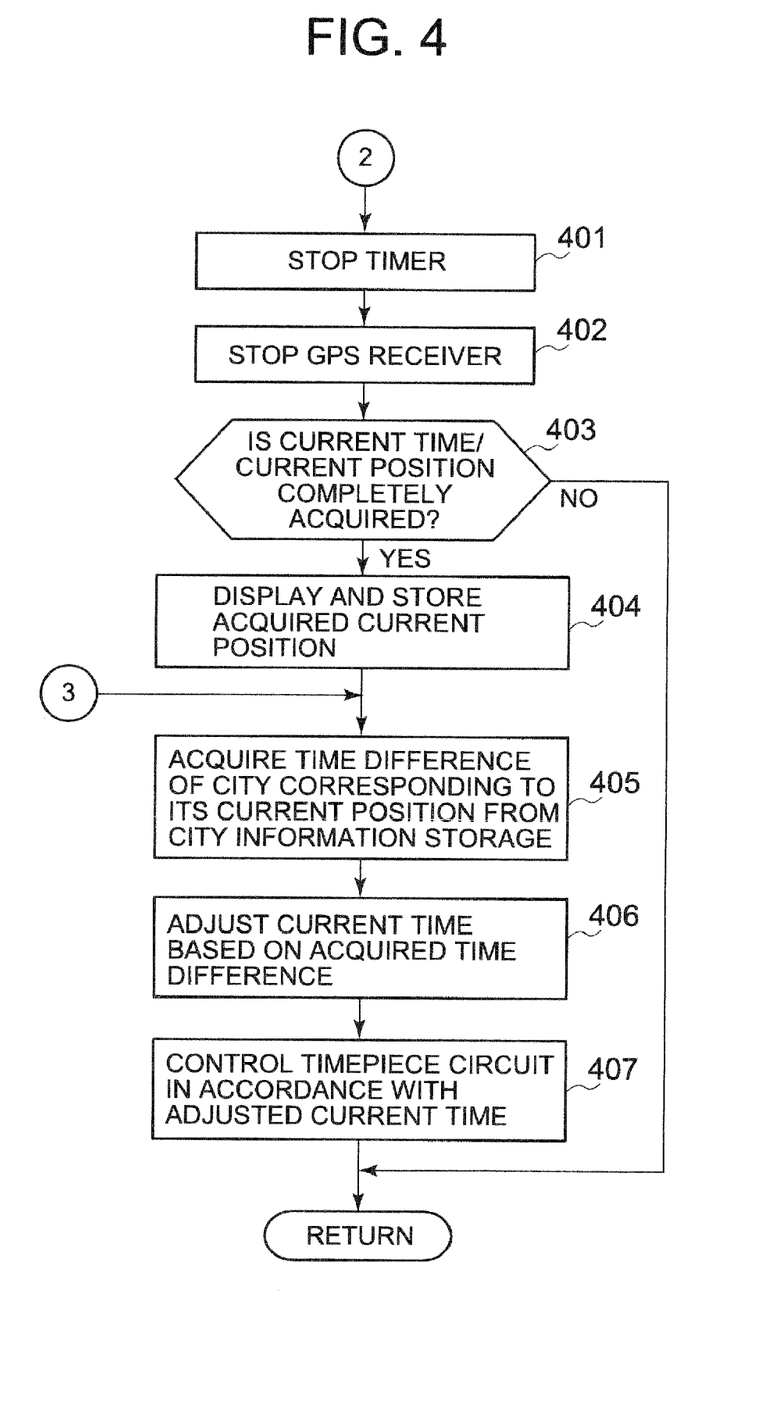
FIG. 4 is a flow char continued to the FIG. 2.

FIGS. 2-4 are a flowchart of a position/time calculation process to be performed by the GPS timepiece of the first embodiment. As shown in FIG. 2, the controller 17 initializes data stored in a working area of the memory 13 (step 201), and then determines whether there is issued a command to specify a current position of the GPS timepiece (step 202). When a predetermined time has elapsed at predetermined intervals of time or when a user of the GPS timepiece 10 has given a predetermined input (for example, by depression of a predetermined key) at the operation unit 15, the controller 17 may determine that there is issued the command to specify the current position of the GPS timepiece.

When the determination is Yes in step S202, the controller 17 starts up the GPS receiver 12 (step 203) and hence a timer provided in the controller 17 (step 204). The reception state detector 19 acquires information on the number of GPS satellites from which the GPS receiver 12 has received the radio waves and on the intensities of the received signals.

Then, the controller 17 refers to the acquired information on the number of GPS satellites and on the intensities of the signals received, and then determines whether the elapsed time of the timer is 5 seconds or less (Yes in step 205), whether the intensities of the received signals are is −130 dBm or more (Yes in step 206) and whether the number of GPS satellites from which the signals of −130 dBm or more are received is 4 or more (Yes in step 207).

If so, then, the reception state detector 19 acquires a predetermined time, for example, of approximately 50 seconds, in which the GPS receiver 12 continues to receive the GPS radio waves. In this case, there is a high possibility that the detection unit 19 acquires desired information on the respective orbits and on the respective radio-wave emission GMT clock times of the four GPS satellites. When the timer time exceeds 50 seconds (Yes in step 208), the controller 17 calculates a current position of the GPS timepiece and a current standard time based on the orbit information and the radio-wave emission GMT clock time information of the GPS satellites in a well-known method (step 209).

As described above, in the present embodiment, the current time and the current position of the GPS timepiece are calculated based on the orbit information and radio-wave emission GMT clock time information included in the radio waves received from the respective four GPS satellites. Let $t_i$ where i=1, 2, 3 or 4; $(x_i, y_i, z_i)$ where i=1, 2, 3 or 4; (x, y, z); and $t_r$ be a radio-wave emission GMT clock time at any one of the four GPS satellites, as indicated by the radio-wave emission GMT clock time information; the position of that GPS satellite; the current position of the GPS timepiece 10; and a time at the GPS timepiece when the GPS timepiece received the radio-wave emission GMT clock time information from the four GPS satellites, respectively.

Then, the following expression holds:

$$r'^2_i = (x_i-x)^2+(y_i-y)^2+(z_i-z)^2 \text{ where } i=1, 2, 3 \text{ or } 4$$

$$r'_i = r_i - c\delta \text{ and } r_i = c(t_r-t_i)$$

where c is the light velocity and δ is a time error involved in the GPS timepiece. By acquiring the radio-wave emission GMT clock time $t_i$ and the position $(x_i, y_i, z_i)$ of a respective satellite based on the radio waves received from that satellite, the current position (x, y, z) of the GPS timepiece and the time error δ are calculated. By subtracting the error δ from the reception time $t_r$ at the GPS timepiece, a correct current time is obtained. A process to be performed when 50 seconds has elapsed in step 208 (No in step 208) will be described later.

When the determination is No in step 206 or 207, the controller 30 returns to step 205. When the determination is No in step 205, or 5 seconds have elapsed in a state where four or more GPS satellites cannot be captured from which the signals are received at an intensity of more than −130 dBm, the controller 30 determines whether the timer time is 20 seconds or less (step 301 in FIG. 3).

When the determination is Yes in step 301, the controller 17 determines whether the GPS timepiece is receiving GPS radio waves of more than −140 dBm from the GPS satellites (step 301). In this case, the number of GPS satellites from which the radio waves are received may be 1 (unity).

When the determination is No in step 301, the controller 17 determines that reception of the GPS radio waves from the GPS satellites has failed, stops the timer (step 302) and also stops the GPS receiver 12 (step 303), thereby terminating the processing operation. That is, when the controller 17 cannot capture GPS radio waves from at least one GPS satellite within 20 seconds of the timer time, the controller 17 terminates the processing operation.

When the determination is Yes in step 301, the GPS receiver 12 acquires only time information available in a relatively short time, for example, of approximately 30 seconds from GPS satellites from which the GPS radio waves have been received successfully. In greater detail, when the determination is Yes in step 301, the GPS receiver 12 acquires the radio-wave emission GMT clock time information from the GPS satellites from which the GPS receiver 12 has captured the GPS radio waves when the timer time is 30 seconds or less (Yes in step 305). Then, the controller 17 calculates a current time at the GPS timepiece based on the acquired radio-wave emission GMT clock time information (step 306).

In step 306, the controller 17 calculates a current time based on a time obtained from the radio-wave emission GMT clock time information received from the GPS satellites. It is presumed based on approximately 20,000 km of the altitude of each GPS satellite and approximately 300,000 km of the light velocity that it takes approximately 70 milliseconds for the time information transmitted from the GPS satellite to reach the GPS receiver 12. In step 306, the sum of the satellite radio-wave emission GMT clock time when the associated satellite emitted its radio waves, obtained from the received time information and the time required for the light to reach from the GPS satellite to the GPS timepiece is handled as the current time at the GPS timepiece. Alternatively, since the time required for the light to reach the GPS timepiece from the satellite is less than 1/10 seconds, the time indicated by the radio-wave emission GMT clock time information received from the GPS satellite may be handled as the current time.

When 30 seconds of the timer time has elapsed (No in step 305), the controller 17 stops the timer (step 307) and also stops the GPS receiver 12 (step 308). Then, the controller 17 completely acquires the radio-wave emission GMT clock time information from the GPS satellites in step 306, and determines whether the current time of the GPS timepiece 10 has been calculated (step 309).

When the determination is No in step 309, the controller 17 terminates the processing operation. When the determination is Yes in step 309, the controller 17 determines whether data on the current position of the GPS timepiece calculated in the previous process is stored in the memory 13 (step 310). If the determination is No in step 310, the controller 17 displays on the display 16 an alarm indicating that acquisition of the current time has failed (step 311) and then terminates the processing operation.

If the determination is No in step 208, or when the controller 17 calculates the current position of the GPS timepiece and the current time based on the information from the four GPS satellites and 50 seconds of the timer time has elapsed, the controller 17 stops the timer (step 401 in FIG. 4) and also stops the GPS receiver 12 (step 402). The controller 17 then determines whether information on the current position and the current time of the GPS timepiece has been completely acquired (step 403). If the determination is No in step 403, the controller terminates the processing operation.

When the determination is Yes in step 403, the controller 17 displays the calculated current position of the GPS timepiece on the display 16 and stores data on the current position and current time in the memory 13 (step 404). Then, the controller 17 refers to the city information storage area 14 of the memory 14 to locate a city which involves the current position of the GPS timepiece and acquires a time difference of the city from its associated standard time (step 405).

The controller 17 controls the timepiece circuit 11 based on the current time which allows for the associated time difference and adjusts the current time counted by the timepiece circuit 11. Even when the determination is Yes in step 301, the controller 17 refers to the city information storage area 14 based on the previous position data stored in the memory 13, locates a city which involves the current position of the GPS timepiece represented by the previous position data, and then acquires a time difference of the city from its associated standard time (step 405). That is, when the processing operations in steps 301 and 304-306 have been performed, only the current time has been acquired. Thus, the position data stored in the memory 13 and obtained in the previous process is used as representing the current position of the GPS timepiece.

According to the first embodiment, when the GPS radio waves of more than a first intensity, for example of −130 dBm, have been received from a first predetermined number of (for example, 4) GPS satellites within a first predetermined time, for example, of 5 seconds, the GPS receiver 12 acquires both the orbit information and the radio-wave emission GMT clock time information on the GPS satellites. When the GPS radio waves of more than a second intensity (for example, of −140 dBm) lower than the first intensity have been received within a second time (for example, of 20 seconds) longer than the first predetermined time, the GPS receiver 12 acquires only the radio-wave emission GMT clock time information from the GPS satellites. As just described, by changing the information to be acquired depending on the intensity of the received signals (and by acquiring only part of the information when the intensity of the received signal is less than a predetermined level), a situation where no information is acquired is prevented from occurring although the GPS receiver 12 is operating.

Further, in the first state, the GPS receiver 12 is operated only for a third predetermined time period, for example, of 50 seconds to acquire the radio-wave emission GMT clock time information and the orbit information on the GPS satellites, and then calculate the current time and current position thereof based on the acquired information. In the second state, the GPS receiver 12 is operated only for a fourth predetermined time period, for example, of 20 seconds shorter than the third predetermined time period to acquire the radio-wave emission GMT clock time information and calculate a current time based on this time information. Like this, the operation time of the GPS receiver is changed depending on the acquired information to suppress useless power consumption.

In the first embodiment, when the memory 13 has stored information indicative of the current position of the GPS timepiece in the second state, the controller 17 can use the information indicative of the current position of the GPS timepiece to acquire an associated time difference and calculate a current time based on the time difference.

In a second embodiment of the present invention, the GPS timepiece comprises a photoelectric element whose electronic conductivity characteristic changes depending on light applied to the element. When an electric conductivity is considered to be due to solar light applied to the element, it is determined that there is a high possibility that the GPS timepiece is positioned outdoors and then its reception of the GPS radio waves is started.

Figure 5:
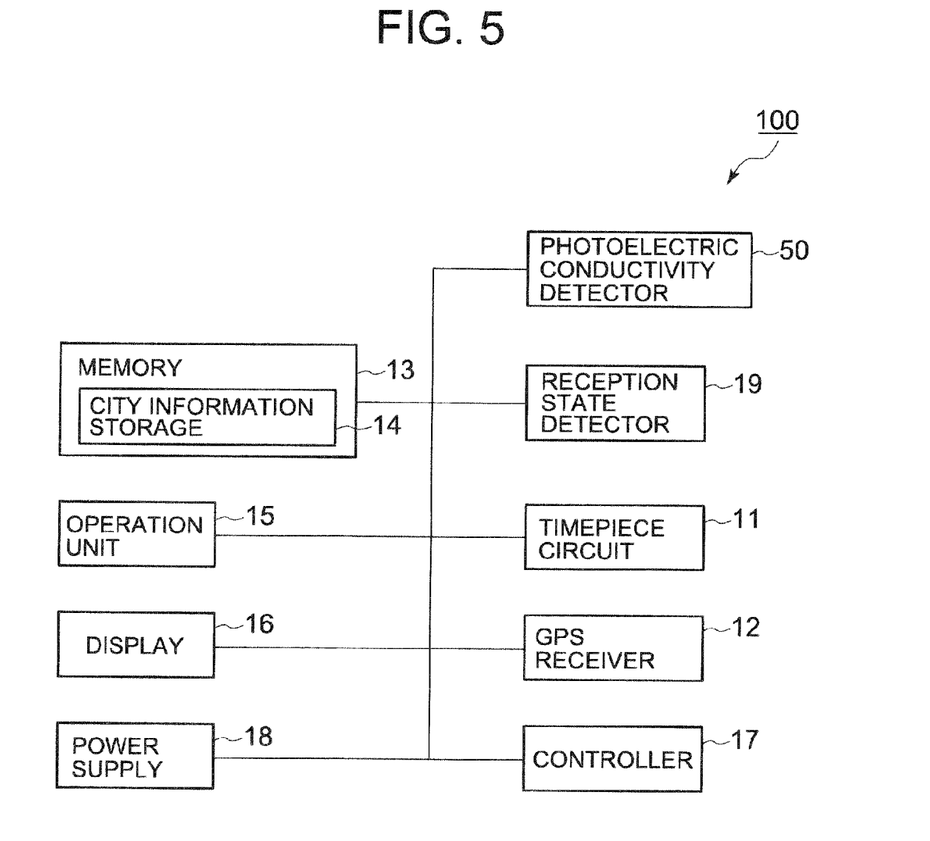
FIG. 5 is a block diagram of a GPS timepiece according to a second embodiment of the present invention.

FIG. 5 is a block diagram of the GPS timepiece 100 of the second embodiment. The same reference numerals are used for the same components as in FIG. 1 for convenience, and new reference numerals are employed for the new components used in an analogous way. As shown in FIG. 5, in addition to the same components as in FIG. 1 the GPS timepiece 10 of the second embodiment comprises a photoelectric conductivity sensor 50 which in turn comprises a photoelectric element such as a Cds photoelectric element or phototransistor whose electric conductivity changes depending on the quantity of light applied to the photoelectric element. The photoelectric conductivity sensor 50 senses an electronic conductivity of the photoelectric element and outputs a corresponding information, or information representing the received light quantity.

The intensity of the GPS radio waves received from the GPS satellites is low indoors. In addition, it takes much time for the measurement of the position of the GPS timepiece, and the position information and the radio-wave emission GMT clock time information cannot be often acquired completely. In such a case, the GPS receiver 12 whose power consumption is high is not started up. Only when it is considered that the GPS timepiece 100 is positioned outdoors, the GPS receiver 12 is started up.

Figure 6:
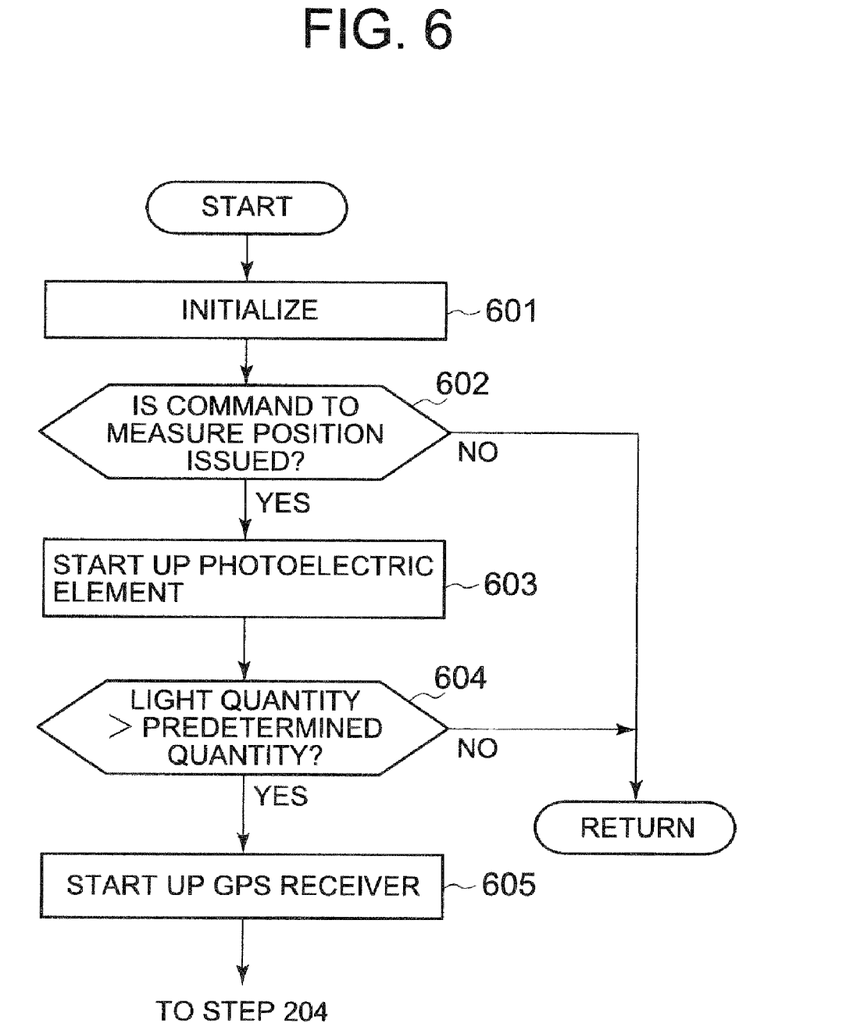
FIG. 6 is a flowchart of a process to be performed by the GPS timepiece in the second embodiment.

FIG. 6 is a flowchart of a process to be performed by the GPS timepiece of the second embodiment. As shown in FIG. 6, the controller 17 initializes data stored in the working area of the memory 13 (step 601) and then determines whether there is issued a command to measure the position of the GPS timepiece (step 602). As in the first embodiment, the controller 17 may determine that there has been issued a command to measure the position of the GPS timepiece when a predetermined time has elapsed in units of a predetermined time period, or when a user operates the operation unit 15 to give a predetermined input, for example, by operating a corresponding key.

When the determination is Yes in step 602, the controller 17 starts up the photoelectric element of the photoelectric conductivity sensor 50 (step 603). Then, the controller 17 acquires information indicative of an applied light quantity from the photoelectric conductivity sensor 50 and determines whether the light quantity is above a predetermined level (step 604).

When the determination is No in step 604, the controller 17 terminates the processing operation. When the determination is Yes in step 604, the controller 17 starts up the GPS receiver 12 (step 605). Then, as in the first embodiment, the controller 17 performs the processing operation starting at steps 204 as in the first embodiment.

In the second embodiment, the controller 17 determines whether the GPS timepiece 100 is outdoors based on information indicative of the light quantity sensed by the photoelectric conductivity sensor 50. Thus, only when there is a high provability that radio waves from the GPS satellite is received, the GPS receiver 12 can be operated, thereby preventing useless power consumption.

In a third embodiment of the present invention, a solar cell is used along with the power supply 18 to supply power to the GPS timepiece. When power which is considered to be due to solar light directly applied to the solar cell is obtained from the solar cell, it is determined that there is a high provability that the GPS timepiece is positioned outdoors, thereby starting the GPS radio wave reception.

Figure 7:
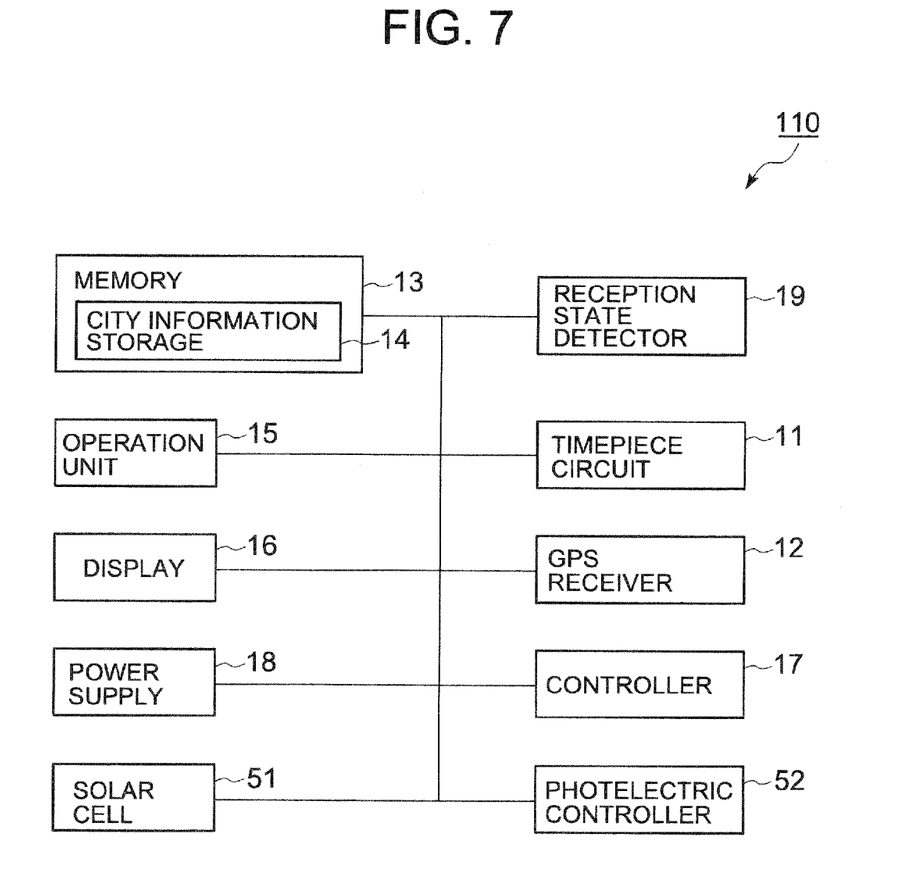
FIG. 7 is a block diagram of a GPS timepiece of a third embodiment.

FIG. 7 is a block diagram of the GPS timepiece 110 of the third embodiment. Like reference numerals are used for the same reference components as in FIG. 1 for convenience, and new reference numerals are employed for the new components used in an analogous way. The new components are a solar cell 51 which supplies power to the respective elements of the GPS timepiece, and a power controller 52 which comprises a current meter which measures a current which flows out from the solar cell 51, thereby calculating power supplied to the respective elements of the GPS timepiece. The power controller 52 also controls supply of the power from the solar cell 51 and the power from the primary cell to respective circuits of the GPS timepiece 110.

Figure 8:
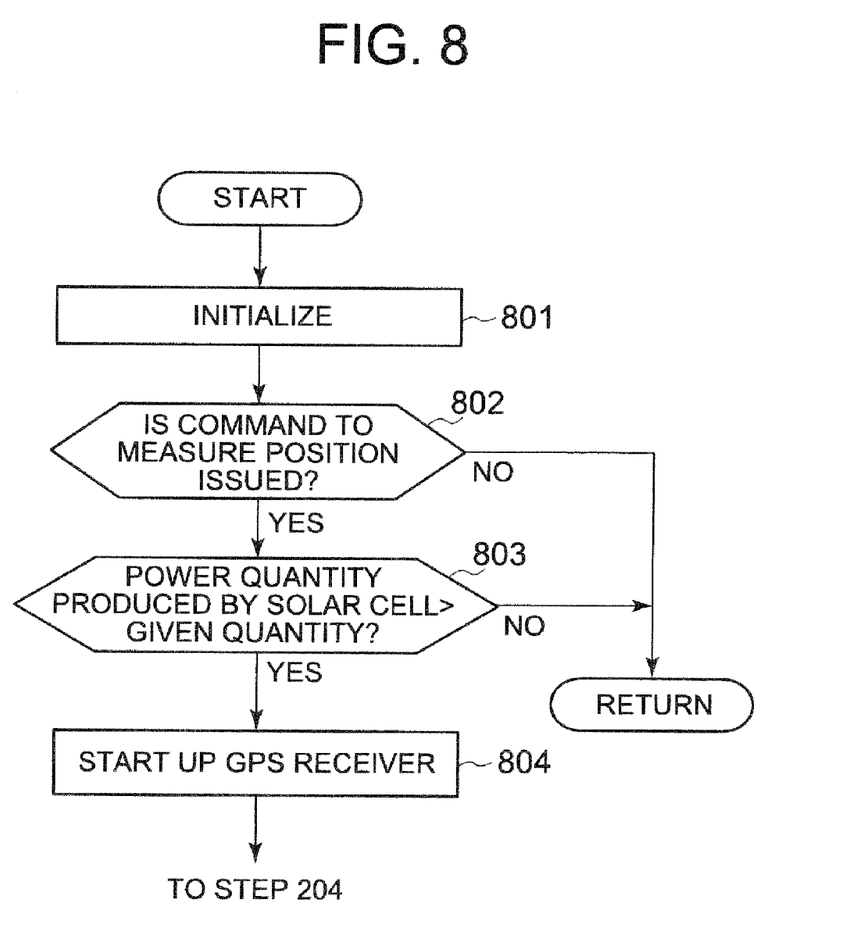
FIG. 8 is a flowchart of a process to be performed by the GPS timepiece according to the third embodiment.

FIG. 8 is a flowchart of a process to be performed by the GPS timepiece in the third embodiment. As shown in FIG. 8, the controller 17 initializes data stored in the working area of the memory 13 (step 801), and then determines whether there is issued a command to measure the position of the GPS timepiece (step 802) as in the first or second embodiments.

When the determination is Yes in step 802, the controller 17 acquires from the photoelectric controller 52 information on a power quantity generated by the solar cell 51 and then determines whether the power quantity is more than a predetermined quantity (step 803). If the determination is No in step 803, the controller 17 terminates this process. If the determination is Yes in step 803, the controller 17 starts up the GPS receiver 12 (step 804). Then, the controller 17 performs the processing operation starting at step 204 as in the first embodiment.

According to the third embodiment, the controller 17 determines based on information on the power quantity generated by the solar cell whether the GPS timepiece is positioned outdoors. Thus, only when there is a high possibility that the GPS receiver can receive radio waves from the GPS satellites, the GPS receiver 12 is operated, thereby preventing useless power consumption.

A fourth embodiment will be described. Also in this embodiment, the GPS timepiece basically uses a photoelectric element whose electric conductivity characteristic is changed depending on light applied to the photoelectric element. Thus, when an electric conductivity characteristic is obtained which is considered due to the sunlight applied to that element, it is determined that there is a high possibility that the GPS timepiece is positioned outdoors, and then the GPS radio wave reception is performed.

Further, in the fourth embodiment even when it is determined that no sunlight applies to the GPS timepiece, and if a moving distance of the GPS timepiece from a place where it is determined that the sun light has been applied to the GPS timepiece is within a predetermined range, it is determined that the GPS timepiece is still positioned outdoors and hence the GPS reception is performed. For example, there can be a case in which because a user of the GPS timepiece stays long in the same place, the same GPS reception is performed both in the daytime and in the nighttime. The fourth embodiment senses such a situation to perform an appropriate GPS reception.

Figure 9:
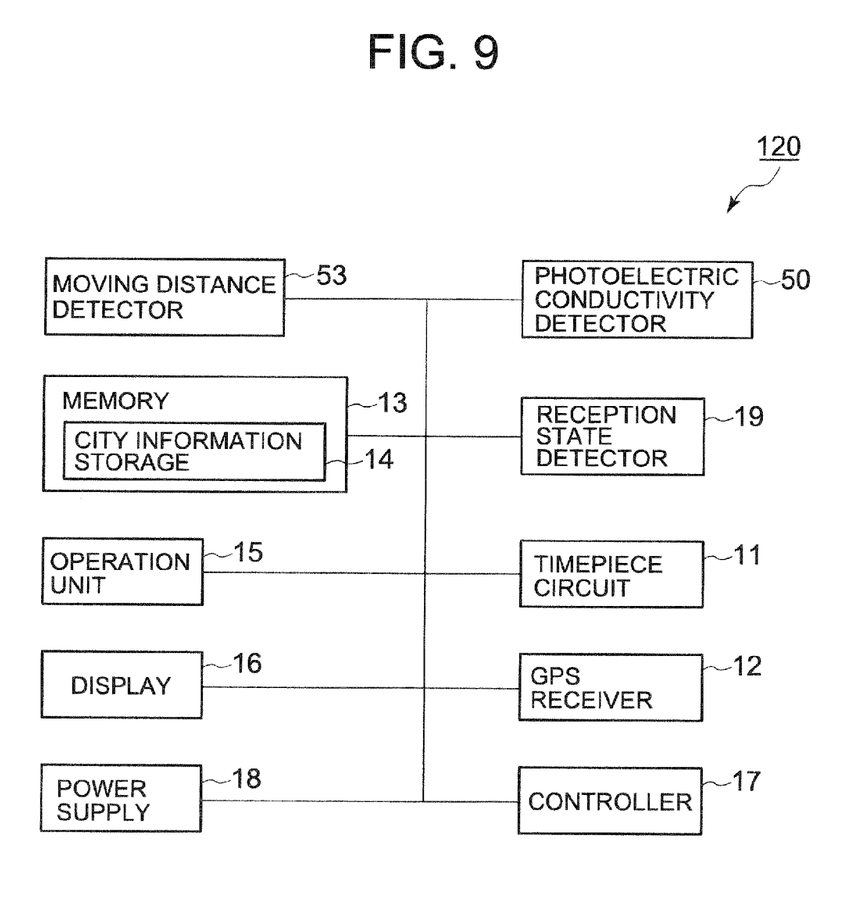
FIG. 9 is a block diagram of a GPS timepiece according to a fourth embodiment.

FIG. 9 is a block diagram of a GPS timepiece 120 of the fourth embodiment. In FIG. 9, the same reference numerals are used for the same components as in FIG. 5 for convenience, and a new reference numeral is employed for the new component used in an analogous way.

The new component is a moving distance detector 53 which detects a moving distance of the GPS timepiece or a user which wears the GPS timepiece. The moving distance detector 53 comprises, for example, an acceleration sensor (not shown) to twice integrate an acceleration of the GPS timepiece 120 sensed by the acceleration sensor, thereby calculating the moving distance of the GPS timepiece. Alternatively, the moving distance detector 53 may include a pedometer. In this case, the moving distance is calculated by multiplying the number of counted spaces by a value indicative of a unit step, for example of 0.7 m, to calculate the moving distance.

Figure 10:
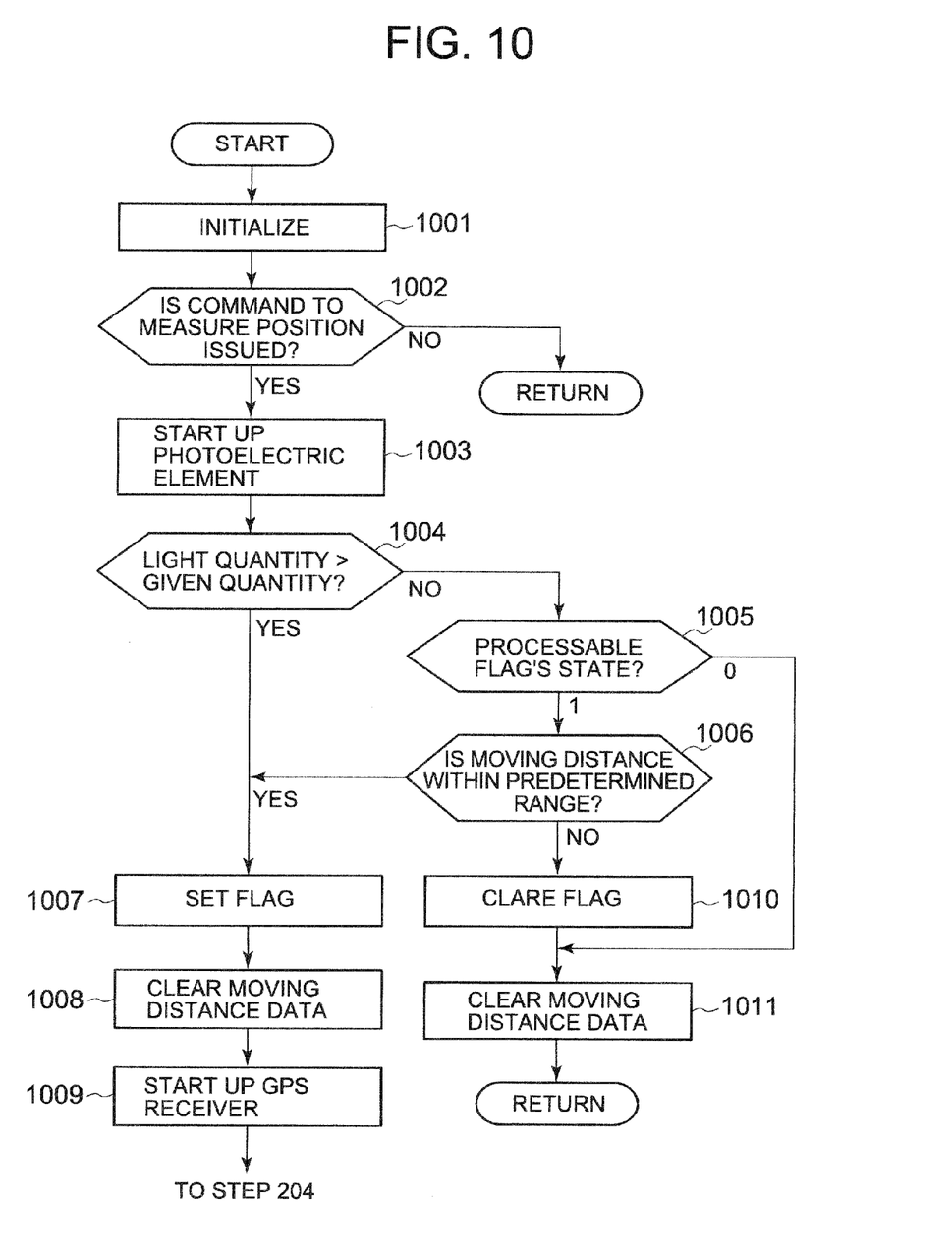
FIG. 10 is a flowchart of a process to be performed by the GPS timepiece according to the fourth embodiment.

FIG. 10 is a flowchart of a process to be performed by the GPS timepiece of the fourth embodiment. As shown in FIG. 10, the controller 17 initializes data stored in the working area of the memory 13 (step 1001) and then determines whether there is issued a command to measure a current position of the GPS timepiece (step 1002) as in the first-third embodiments.

When the determination is Yes in step 1002, then the controller 17 starts up the photoelectric element of the photoelectric conductivity sensor 50 (step 1003). Then, the controller 17 acquires information on a light quantity from the photoelectric conductivity sensor 50 and then determines whether the light quantity is higher than a predetermined quantity (step 1004).

If the determination is No in step 1004, the controller 17 sees a processable flag stored in the memory 13 (step 1005). The flag indicates whether the GPS reception was performed when the processing operation of FIG. 10 was performed previously. When the flag is "0", indicating that no GPS reception was performed previously, the controller 17 instructs the moving distance detector 53 to clear data on the moving distance calculated so far (step 1011).

When the flag is "1", indicating that the GPS reception was performed previously, the controller 17 acquires information on the moving distance from the moving distance detector 53 and then determines whether the moving distance is within a predetermined value (step 1106). If the determination is No in step 1106, the controller 17 clears the flag in the memory to 0 (step 1010), commands the moving distance detector 53 to clear data on the moving distance calculated so far (step 1011), and then terminates the processing operation.

When determination is Yes in step 1006, the controller 17 sets the flag to "1" in the memory 13 (step 1007), and then instructs the moving distance detector 53 to clear data on the moving distance calculated so far (step 1008). Then, the controller 17 starts up the GPS receiver 12 (step 1009) and then performs the processing operation starting at step 204 as in the first embodiment.

Also when the determination is Yes in step 1004, the controller 17 sets the processable flag in the memory 13 to "1" (step 1007) and then instructs the moving distance detector 53 to clear data on the calculated moving distance (step 1008). Then, the controller 17 starts up the GPS receiver 12 (step 1009). Then, the controller performs the processing operation starting at step 204 as in the first embodiment.

According to the fourth embodiment, even when the light quantity from the photoelectric conductivity sensor 50 is smaller than the predetermined quantity, and when the GPS radio waves were received by the GPS receiver 12 in the previous process and the moving distance of the GPS timepiece measured since that time is within the predetermined range, the GPS receiver 12 starts to operate. Thus, even when no predetermined light quantity is available, for example due to nighttime, appropriate GPS radio waves are received.

Figure 11:
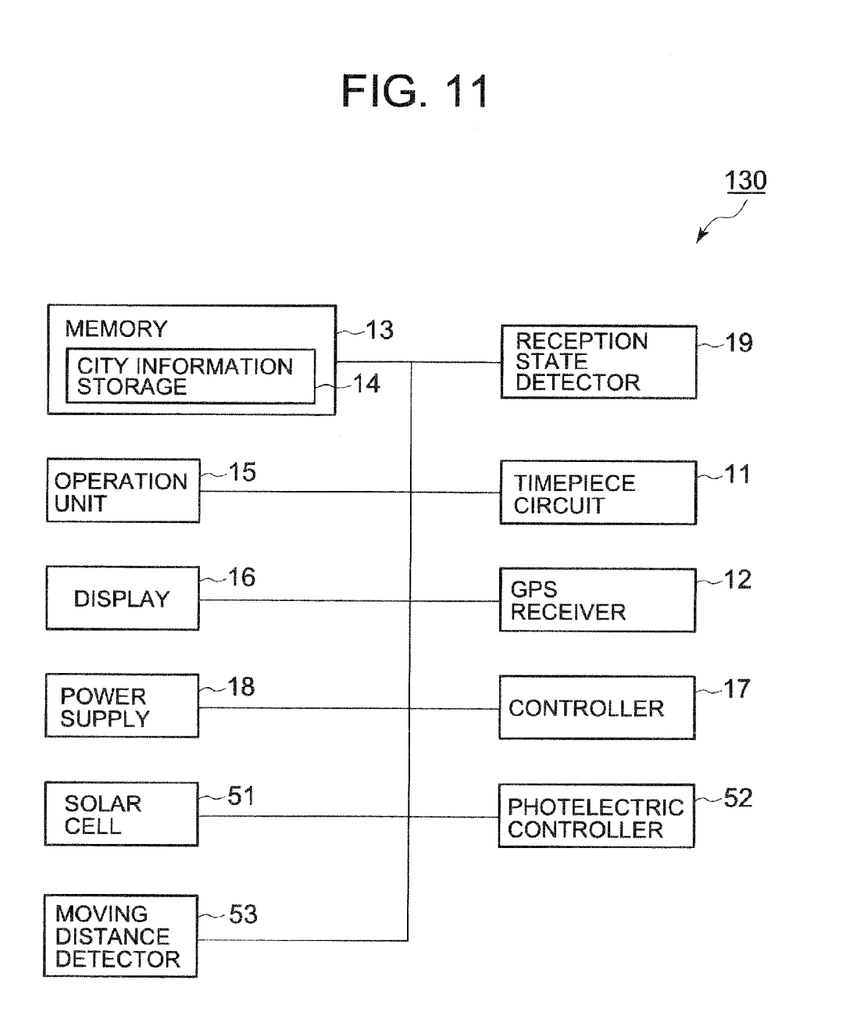
FIG. 11 is a block diagram of a GPS timepiece according to a fifth embodiment.

The moving distance detector 53 of the fourth embodiment may be provided in the GPS timepiece of the third embodiment (FIG. 11). The controller 17 of the GPS timepiece 130 of FIG. 11 in this case is required to determine a power quantity generated by the solar cell (step 803 of FIG. 8) instead of starting to drive the photoelectric element (step 1003) and determining the light quantity (step 1004) of FIG. 10.

The first-fourth times illustrated in the above embodiments are only extemporary and the present invention is not limited to those.

While in the above embodiments the intensity of the received signal is illustrated as used as the signal quality, the present invention is not limited to this particular example, but may use a signal-to-noise (S/N) (or carrier-to-noise (C/N)) ratio for the received signal. Of course, indexes indicative of other signal qualities may be used.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The invention claimed is:

1. A position/time detecting apparatus comprising:
GPS reception means for receiving radio waves from GPS satellites and for acquiring information included in the radio waves;
reception state detection means for detecting, from the received radio waves, (i) a number representing how many GPS satellites from which the radio waves were received, and (ii) respective intensities of the radio waves received from the GPS satellites;
time period measuring means for measuring a time period; and
position/time calculating means for calculating a current position and a current time of the position/time detecting apparatus based on the information acquired by the GPS reception means;
wherein:
in a first state in which the GPS reception means has received radio waves of a first quality value from a first predetermined number of GPS satellites within a first predetermined time period measured by the time measuring means, the GPS reception means acquires orbit information and time information from radio waves emitted by the respective GPS satellites, the time information indicating a GMT at the respective GPS satellite when the satellite emitted the radio waves;
in a second state in which the GPS reception means has received radio waves of a second quality value smaller than the first quality value from a second predetermined number of GPS satellites smaller than the first predetermined number of GPS satellites within a second predetermined time period longer than the first predetermined time period measured by the time measuring means, the GPS reception means acquires time information from radio waves emitted by the respective GPS satellites, the time information indicating a GMT at the respective GPS satellite when the satellite emitted the radio waves;
the position/time calculating means calculates in the first state the current position and current time of the position/time detecting apparatus based on the orbit information and the time information; and
the position/time calculating means calculates in the second state the current time based on the time information.

2. The position/time detecting apparatus of claim 1, wherein:
the GPS reception means acquires in the first state the orbit information and the time information from the radio waves emitted by each of the first predetermined number of GPS satellites only for a third predetermined time period; and
the GPS reception means acquires in the second state the time information from the radio waves emitted by each of the second predetermined number of GPS satellites only for a fourth predetermined time period shorter than the third predetermined time period.

3. The position/time detecting apparatus of claim 1, further comprising:

storage means for storing (i) information on positions of a plurality of locations and a like number of time differences each at a respective location from an associated standard time, and (ii) information on the current position of the apparatus;
wherein the position/time calculation means specifies in the first state a time difference at the current position of the position/time detecting apparatus from the associated standard time based on information on the current position of the position/time detecting apparatus and information on the positions of the locations stored in the storage means, adjusts the current time in accordance with the time difference, and stores information indicative of the current position in the storage means; and
when the information on the current position of the position/time detecting apparatus is stored in the storage means, the position/time calculation means specifies in the second state a time difference at the current position of the position/time detecting apparatus from the associated standard time based on the information on the current position of the position/time detecting apparatus and on the positions of the locations stored in the storage means, and then corrects the current time in accordance with the specified time difference.

4. The position/time detecting apparatus of claim 1, wherein the position/time calculation means comprises detection means for detecting that the position/time calculating apparatus is positioned outdoors; and
wherein, only when the detection means detects that the position/time calculating apparatus is positioned outdoors, the GPS reception means acquires either the orbit information and the time information or the time information.

5. The position/time detecting apparatus of claim 4, wherein the detection means comprises a photoelectric element whose electric conductivity changes depending on a quantity of light applied thereto;
wherein when data indicating that the light quantity acquired from the photoelectric element is larger than a predetermined value, the detection means determines that the position/time detecting apparatus is positioned outdoors.

6. The position/time detecting apparatus of claim 4, wherein the detection means comprises means for detecting a quantity of power produced by a solar cell for supplying operating power to the apparatus; and
wherein when the detected quantity of power produced by the solar cell is larger than a predetermined quantity, the detection means determines that the position/time detecting apparatus is positioned outdoors.

7. The position/time detecting apparatus of claim 5, further comprising moving distance detection means for detecting a moving distance of the position/time detecting apparatus;
wherein (i) when the GPS reception means acquires either the time information or the time information and the orbit information, the position/time calculation means sets a processable flag in the storage means, and (ii) when the GPS reception means does not acquire either the time information or the time information and the orbit information, the position/time calculation means clears the processable flag in the storage means; and
wherein, even when the detection means does not determine that the GPS timepiece is positioned outdoors, and when the position/time calculation means has set the flag and the moving distance detected by the moving distance detection means is within a predetermined range, the GPS reception means acquires either the time information or the orbit information and the time information.

8. A timepiece comprising:
the position/time detecting apparatus of claim 1;
an internal clock;
a timepiece circuit which counts a current time in accordance with the internal clock; and
adjusting means for adjusting a current time of the timepiece circuit in accordance with the current time acquired by the position/time detecting apparatus.

9. The timepiece of claim 8, further comprising display means for displaying the current position of the timepiece acquired by the position/time detecting apparatus.

10. A timepiece comprising:
the position/time detecting apparatus of claim 2;
an internal clock;
a timepiece circuit which counts a current time in accordance with the internal clock; and
adjusting means for adjusting a current time of the timepiece circuit in accordance with the current time acquired by the position/time detecting apparatus.

11. The timepiece of claim 10, further comprising display means for displaying the current position of the timepiece acquired by the position/time detecting apparatus.

12. A timepiece comprising:
the position/time detecting apparatus of claim 3;
an internal clock;
a timepiece circuit which counts a current time in accordance with the internal clock; and
adjusting means for adjusting a current time of the timepiece circuit in accordance with the current time acquired by the position/time detecting apparatus.

13. The timepiece of claim 12, further comprising display means for displaying the current position of the timepiece acquired by the position/time detecting apparatus.

14. A timepiece comprising:
the position/time detecting apparatus of claim 4;
an internal clock;
a timepiece circuit which counts a current time in accordance with the internal clock; and
adjusting means for adjusting a current time of the timepiece circuit in accordance with the current time acquired by the position/time detecting apparatus.

15. The timepiece of claim 14, further comprising display means for displaying the current position of the timepiece acquired by the position/time detecting apparatus.

16. A timepiece comprising:
the position/time detecting apparatus of claim 5;
an internal clock;
a timepiece circuit which counts a current time in accordance with the internal clock; and
adjusting means for adjusting a current time of the timepiece circuit in accordance with the current time acquired by the position/time detecting apparatus.

17. The timepiece of claim 16, further comprising display means for displaying the current position of the timepiece acquired by the position/time detecting apparatus.

18. A timepiece comprising:
the position/time detecting apparatus of claim 6;
an internal clock;
a timepiece circuit which counts a current time in accordance with the internal clock; and
adjusting means for adjusting a current time of the timepiece circuit in accordance with the current time acquired by the position/time detecting apparatus.

19. The timepiece of claim 18, further comprising display means for displaying the current position of the timepiece acquired by the position/time detecting apparatus.

20. A timepiece comprising:
the position/time detecting apparatus of claim 7;
an internal clock;
a timepiece circuit which counts a current time in accordance with the internal clock; and
adjusting means for adjusting a current time of the timepiece circuit in accordance with the current time acquired by the position/time detecting apparatus.

21. The timepiece of claim 20, further comprising display means for displaying the current position of the timepiece acquired by the position/time detecting apparatus.

* * * * *